United States Patent [19]

Scrimshaw

[11] 4,160,329
[45] Jul. 10, 1979

[54] METHOD AND APPARATUS FOR MEASURING PIPE COATING THICKNESS

[75] Inventor: Martin R. Scrimshaw, Immingham, England

[73] Assignee: Bredero Price, B.V., Hague, Netherlands

[21] Appl. No.: 832,536

[22] Filed: Sep. 12, 1979

[51] Int. Cl.² .......................... G01B 5/08; G01B 5/10
[52] U.S. Cl. ............................... 33/178 D; 33/147 J; 33/147 N; 33/178 E
[58] Field of Search ............. 33/143 L, 147 T, 147 J, 33/147 L, 147 N, 148 E, 148 F, 148 H, 149 J, 160, 178 D, 178 E

[56] References Cited

U.S. PATENT DOCUMENTS

| | | | |
|---|---|---|---|
| 601,721 | 4/1898 | Vine | 33/147 J |
| 3,846,916 | 11/1974 | Moriya et al. | 33/178 E |
| 3,851,396 | 12/1974 | Klabunde | 33/178 D |
| 3,902,249 | 9/1975 | McClughan | 33/143 L |
| 3,962,792 | 6/1976 | Stepanek et al. | 33/178 E |
| 4,005,528 | 2/1977 | Albertazzi | 33/147 N |

FOREIGN PATENT DOCUMENTS

| | | | |
|---|---|---|---|
| 513162 | 5/1955 | Canada | 33/160 |
| 1279 | 5/1905 | United Kingdom | 33/148 F |
| 251215 | 1/1970 | U.S.S.R. | 33/148 E |

*Primary Examiner*—Richard R. Stearns
*Attorney, Agent, or Firm*—Lowe, Kokjer, Kircher, Wharton & Bowman

[57] ABSTRACT

This invention relates to a method and apparatus for monitoring the amount of coating material that has been applied to a pipe. Opposed parallel sensing arms are positioned in contact with the coated pipe. One of the arms is movable relative to the other arm and in response to variations in the thickness of the coating. A direct mechanical linkage may be utilized to provide a readout of the variations in coating thickness or the movements of the arm may be used to vary the output of a potentiometer to provide an electrical readout. The potentiometer output may, in turn, be coupled with digital circuitry to provide a digital display. The circuitry may also include logic circuitry which will translate the variations in readings into positive or negative deviations from a desired predetermined coating thickness. The invention also contemplates coupling the output from the monitoring device with the controls for the coating plant so as to automatically compensate for excesses or deficiencies in the coating thickness.

8 Claims, 9 Drawing Figures

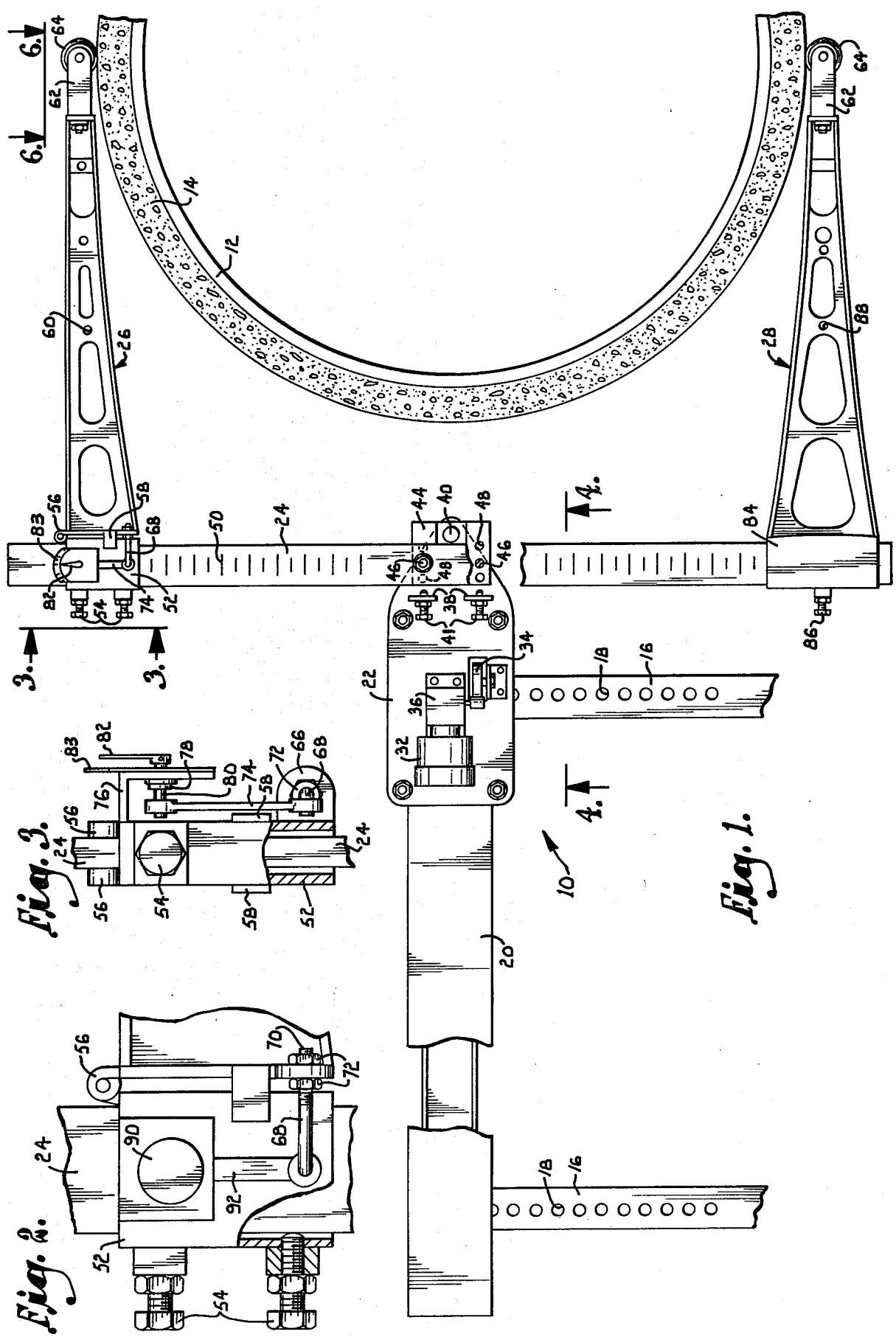

METHOD AND APPARATUS FOR MEASURING PIPE COATING THICKNESS

This invention relates to a method and apparatus for monitoring the amount of coating material applied to a section of pipe.

All pipe which is placed underground or under water is coated with a corrosion protection coating. Whenever pipe is to be laid under water, it is also frequently necessary to apply a weight coating to the pipe for antibuoyancy purposes. The weight coating may take one of several forms, including mastic type coating and high-density concrete coating.

Specifications normally call for a minimum quantity of coating material to assure adequate weight for antibuoyancy purposes. Coating applicators, on the other hand, desire not to put on any significant excess coating material since, to do so, would increase the cost of the coating operation. Accordingly, it is the practice to continually monitor the amount of coating material applied to a pipe to be sure that the minimum quantity necessary for the minimum weight is present, but also to be sure that large excesses resulting in wasted material are not applied. The prior art techniques for monitoring the amount of coating material applied have taken two basic approaches. One of these is to weigh, periodically, a coated pipe joint to determine if the amount of coating material is correct. The disadvantage of this technique is that deficiencies or excesses in the coating processes only come to light after several joints of pipe have been coated.

The second basic approach is to periodically position a tape measure around the pipe during the coating process to determine the diameter and, accordingly, whether or not the proper weight is being applied. The disadvantage of this technique is that the accuracy is never as high as desired and the ability to take a measurement while coating is being applied varies greatly with the skill of the particular workman involved. Furthermore, there is always some danger present for the workman when approaching the pipe that is rotating at a high rate of speed. Even under the best of circumstances, such a measuring technique cannot be practiced on a continuing basis as the coating is being applied to the pipe.

It is therefore an object of the present invention to provide a method and apparatus to monitor the amount of coating material applied to a pipe with much greater accuracy than has been possible with heretofore practiced hand-held tape measuring devices.

Another primary object of the present invention is to provide a method and apparatus for monitoring the amount of coating material applied to a pipe whereby monitoring can be done continuously during the coating operation and any deficiencies or excesses of coating material corrected before no more than one joint of pipe is completely coated.

Another important object of the invention is to provide a method and apparatus for monitoring the amount of coating material applied to a pipe whereby a continuous graphic record of the amount of material applied to each individual pipe section may be provided if desired.

It is also an important objective of this invention to provide a method and apparatus for monitoring the amount of coating material applied to a pipe whereby there can be automatic adjustment of the coating apparatus in response to the variations in the quantity of material which is being applied to the pipe.

A further object of the invention is to provide a method and apparatus for monitoring the amount of coating material applied to a pipe wherein the monitoring device may be rapidly moved into and out of its operative position, and which requires no manual labor once in operation.

It is also an aim of this invention to provide a method and apparatus for monitoring the amount of coating material applied to a pipe which can accommodate simultaneous rotational and longitudinal movement of the pipe during the coating process and also the whipping action sometimes experienced without resulting in false readings as to the amount of coating material being applied.

As a corollary to the above aim, it is an objective of the invention to provide a method and apparatus for monitoring the amount of coating material applied to a pipe which is self-balancing and self-damping.

Another one of the objects of this invention is to provide a method and apparatus for monitoring the amount of coating material applied to a pipe whereby different diameters of pipe may be accommodated using the same basic method and apparatus.

Still another important object is to provide a method and apparatus for monitoring the amount of coating material applied to a pipe which can continuously operate during the coating process and which does not damage the coating while in operation.

Other objects of the invention will be made clear or become apparent from the following description and claims when read in light of the accompanying drawings wherein:

FIG. 1 is a front elevational view of the apparatus of the present invention shown in operable relationship to a coated section of pipe;

FIG. 2 is a greatly enlarged fragmentary sectional view showing a modified form of the invention whereby the measuring arm is coupled with a potentiometer;

FIG. 3 is another enlarged elevational view looking in the direction of 3—3 of FIG. 1 and with portions broken away and shown in cross section for purposes of illustration;

Figure 4:
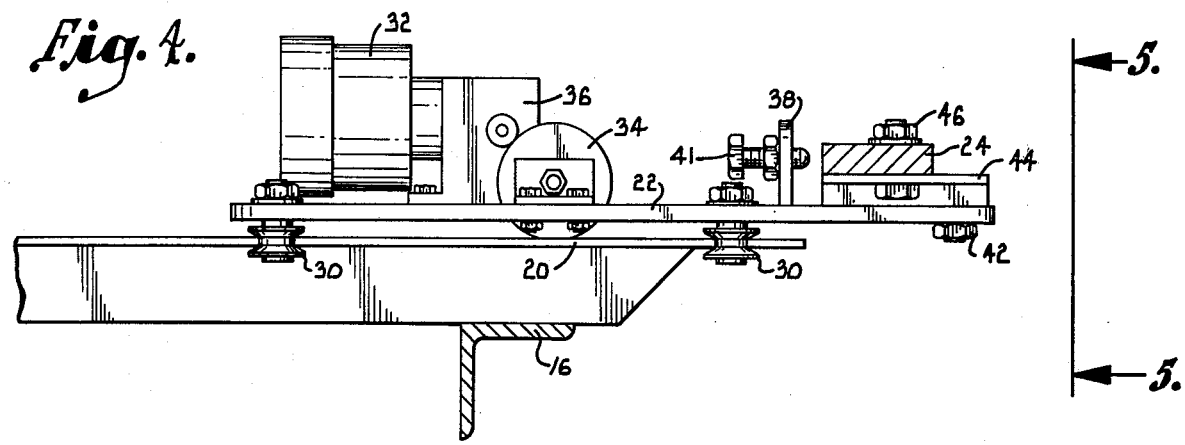
FIG. 4 is an enlarged cross sectional view taken along 4—4 of FIG. 1.

Referring initially to FIG. 1, the coating monitoring device of the present invention is designated generally by the numeral 10. The device 10 is disposed in side-by-side relationship to a joint of pipe 12 to which has been applied a relatively thick layer of concrete coating material 14. The device 10 is mounted upon two parallel angle iron supports 16 each of which is provided with a plurality of aligned openings 18 extending along its length. Mounted on the supports 16 is a longitudinally extending plate 20 which presents a monorail support for a movable support plate 22. Plate 22 in turn pivotally mounts a graduated vertical boom 24 having parallel, horizontally disposed first and second sensing arms 26 and 28, respectively.

Figure 5:
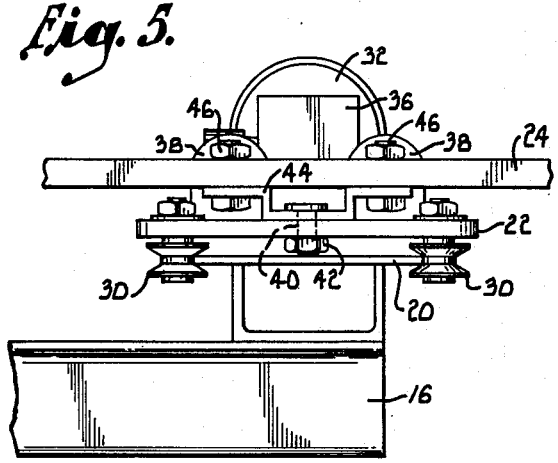
FIG. 5 is an end elevational view looking in the direction of 5—5 of FIG. 4.

Referring in greater detail to the construction of movable support plate 22 and the structure associated with it, these details of construction are best illustrated in FIGS. 4 and 5. Support plate 22 is provided with four flanged rollers 30 disposed in spaced apart relationship and engageable with the edges of rigid mounting plate 20. An electric motor 32 is mounted on plate 22 and is the prime mover for a rubber drive wheel 34 to which the motor is coupled through suitable reduction gearing designated by the numeral 36. Manifestly, drive wheel 34 is in frictional engagement with plate 20. Two upstanding brackets 38 which are rigid with plate 22 provide mounts for nut and bolt assemblies 41 that serve as adjustable stops against movement of the boom 24 as will be explained in greater detail hereinafter.

With particular reference to FIG. 5, it is seen that the triangular shaped nose of plate 22 supports a pivot pin 40 which is secured by a nut 42 and which, in turn, mounts a winged U-shaped bracket 44. Nut and bolt assemblies 46 disposed on opposite sides of pivot pin 40 pass through the wings of bracket 44 to secure boom 24 in rigid relationship to the bracket. It can be seen in viewing FIG. 1 that the wings of bracket 44 are provided with a plurality of openings 48 to accommodate adjustable positioning of the boom relative to pivot point 40 for purposes to be more fully explained hereinafter.

Boom 24 is provided with graduations 50 along its length to permit first and second arms 26 and 28 to be preset at the approximate outside diameter of the coated pipe 12 and 14. Boom 24 is disposed in a generally vertical plane and is of a length slightly greater than the maximum diameter of coated pipe which is to be monitored. First sensing arm 26 is mounted toward the upper end of boom 24 by means of a sleeve 52 and adjustable tensioning screws 54 which pass through the sleeve to contact the boom (see FIG. 2). A hinge coupling 56 joins sensing arm 26 with the sleeve while still permitting pivotal movement of the arm. To this end, a pair of guide plates 58 (one of which is visible in FIG. 1) extend from arm 26 on opposite sides of sleeve 52 to guide the pivotal movement of the arm.

Figure 6:
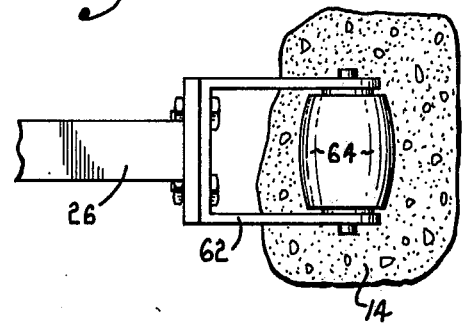
FIG. 6 is a fragmentary top plan view, on an enlarged scale, looking in the direction of 6—6 of FIG. 1.

Sensing arm 26 extends outwardly in generally perpendicular relationship to boom 24, thereby occupying a generally horizontal plane. The sensing arm 26 is of a length somewhat greater than the radius of pipe 12 so that the end of the arm may be positioned at approximately the location of a vertical bisector passing through the pipe. Sensing arm 26 is provided with a plurality of openings 60 for securing weights to the arm, if needed, for balancing purposes as will be explained in greater detail hereinafter. Arm 26 terminates in a yoke assembly 62 which mounts a roller 64 (see FIG. 6) that is in contact with the pipe coating 14.

Referring to FIGS. 2 and 3, at the end of arm 26 which is adjacent to sleeve 52 an ear 66 projects outwardly in transverse relationship to the arm to mount a coupler arm 68. One end 70 of arm 68 passes through ear 66 and is threaded to permit adjustable positioning of the arm relative to ear 66 via nuts 72. The other end of arm 68 is bent into an L and is received by a pivotal linkage 74. An L-bracket 76 which is rigid with sleeve 52 mounts a bushing 78 which in turn receives a pivotal shaft 80. One end of shaft 80 is rigid with pivotal linkage 74 and the other end of the shaft has rigidly mounted on it a pointer 82. Also mounted on bracket 76 between the long leg of the L and pointer 82 is a gauge display panel 83 calibrated in accordance with anticipated variations in the thickness of coating 14.

Second sensing arm 28 is mounted on boom 24 by a sleeve 84 and a tensioning screw 86. There is no pivotal coupling between arm 28 and sleeve 84, rather the arm is completely rigid with the sleeve. Again, as with the arm 26, openings 88 are provided along the length of the arm to permit mounting of weights for balancing purposes. Like arm 26, arm 28 terminates in a yoke assembly 62 which mounts a roller 64.

In operation, plate 20 is first adjusted to a correct vertical height by properly positioning it along angle iron supports 16. Manifestly, different pipe diameters will require plate 20 to be placed in different locations to accommodate different "heights" of the pipe. Next, motor 32 is energized to drive wheel 34 and move the support plate 22 along plate 20 until arms 26 and 28 are positioned in contact with the outer surface of coating 14. To this end, it will be appreciated that arms 26 and 28 are positioned on boom 24 at diametrically opposed locations so that the distance between the arms is approximately equal to the predetermined desired outside diameter of the coated pipe necessary to provide the proper amount of coating material.

The pipe 12 will normally be rotated at a high rate of speed about its axis and simultaneously moved longitudinally as coating 14 is applied. The device 10 will not in any way interfere with the coating operation and is designed to be used simultaneously with application of the coating material. Thus, rollers 64 ride along the applied coating material and as variations in the outside diameter of the coating occur arm 26 will ride up and down moving relative to stationary arm 28. Movement of the arm 26 will in turn move pointer 82 to indicate to a technician the extent of deviations in the coating thickness.

A phenomenon that is invariable experienced during a pipe coating operation is a certain amount of "whipping action" of the pipe. This is attributable to the fact that a relatively long length of pipe (40 feet or more) is supported only at its outermost ends while being rotated at a relatively fast speed. Inherently, a certain amount of "flexing" of the pipe occurs and this may be enhanced if the pipe is not perfectly straight along its longitudinal axis. The whipping action of the pipe which occurs as a result of the foregoing has been illustrated in an exaggerated manner in the schematic showing of FIG. 7. An important feature of the device 10 is that it is designed to accommodate the whipping action illustrated in FIG. 7 without giving false readings of the coating thickness. To this end, the location of pivot point 40 is carefully selected between a vertical plane passing through the outer ends of arms 26 and 28 and a vertical plane passing through the combined center of gravity of the first and second arms (including all structure associated with same) plus the vertical boom 24. Thus, in FIG. 7, pivot point 40 is located to the right of the combined center of gravity of boom 24 plus arms 26 and 28.

Figure 7:
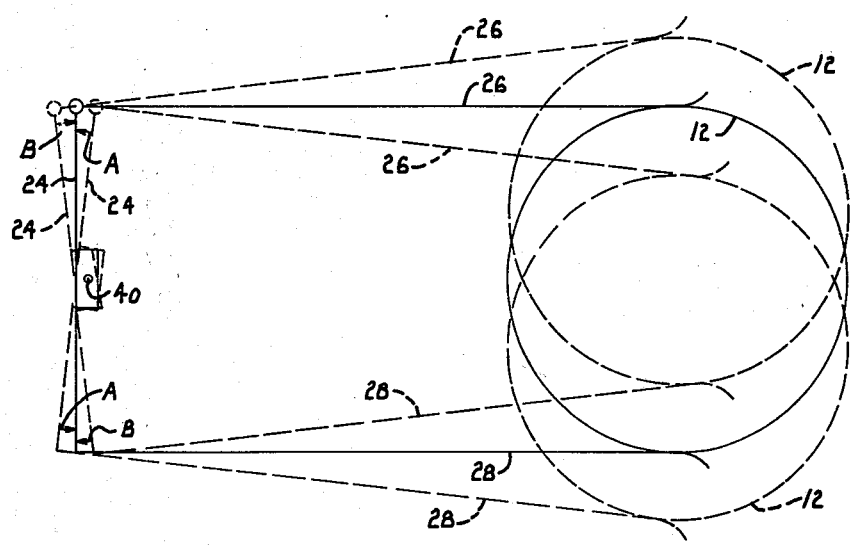
FIG. 7 is a schematic illustration of the manner in which the apparatus of the invention responds to whipping action of the pipe.

Any movement of pipe 12 in a downwardly direction will result in downward pivoting of the boom and arm assembly about pivot point 40 as a result of the weight of the pipe pushing against the arm 28. This downward movement will not affect movement of the upper sensing arm 26 since it is still free to ride along the coating and detect variations in diameter. Distortions in the readings obtained through movement of arm 26 could occur, however, when the pipe 12 moves back upwardly to its normal position but for the careful selection of the location of pivot point 40 as above described. As a result of this location which, in FIG. 7, is to the right of the center of gravity, there will be torsional forces in the direction of arrows A which will lift the boom and arm assembly upwardly as the pipe moves upwardly. The same principle is used to avoid spurious readings as a result of the flexing of the pipe upwardly as a result of the whipping action. Thus, when the pipe moves upwardly from its normal position, the same torsional forces which lifted the assembly to its normal position will continue to act on the assembly to allow it to pivot about point 40 as the pipe moves upwardly. When the pipe moves back down to its normal position, the force of the pipe acting against arm 28 will exert a force in the direction of arrows B to return the assembly to its normal position. From the foregoing, it is seen that the location of pivot point 40 is selected to one side of the center of gravity of the boom and arm assembly so that there will always be a torque force acting on the assembly in the directions of arrows A. This force is countered by the force of pipe 12 pushing downwardly on lower arm 28. This downward force of the pipe is used to hold the assembly in a normal position when no whipping action occurs and to return the assembly to normal position when an upward deflection occurs. On the other hand, the rotational forces acting about pivot point 40 act to return the assembly to its normal position when deflected downwardly as a result of whipping action and also to raise the assembly in unison with the pipe when the pipe deflects upwardly as a result of a whipping action. It is to be noted that the extent of pivotal movement of boom 24 is always limited by adjustable stops 41.

Returning now to FIG. 2 of the drawings, an alternative embodiment of the invention is therein illustrated. A potentiometer is designated by the numeral 90 and is mounted on sleeve 52. A slider arm extension 92 projects from the potentiometer and is coupled with arm 68. Manifestly, movement of arm 68 in response to movement of sensing arm 26 is translated to the potentiometer which produces an electrical signal that is indicative of the amount of coating material applied to the pipe. To this end, it is to be noted that nuts 72 permit fine adjustment to the 0 position of slider arm 92.

Figure 8:
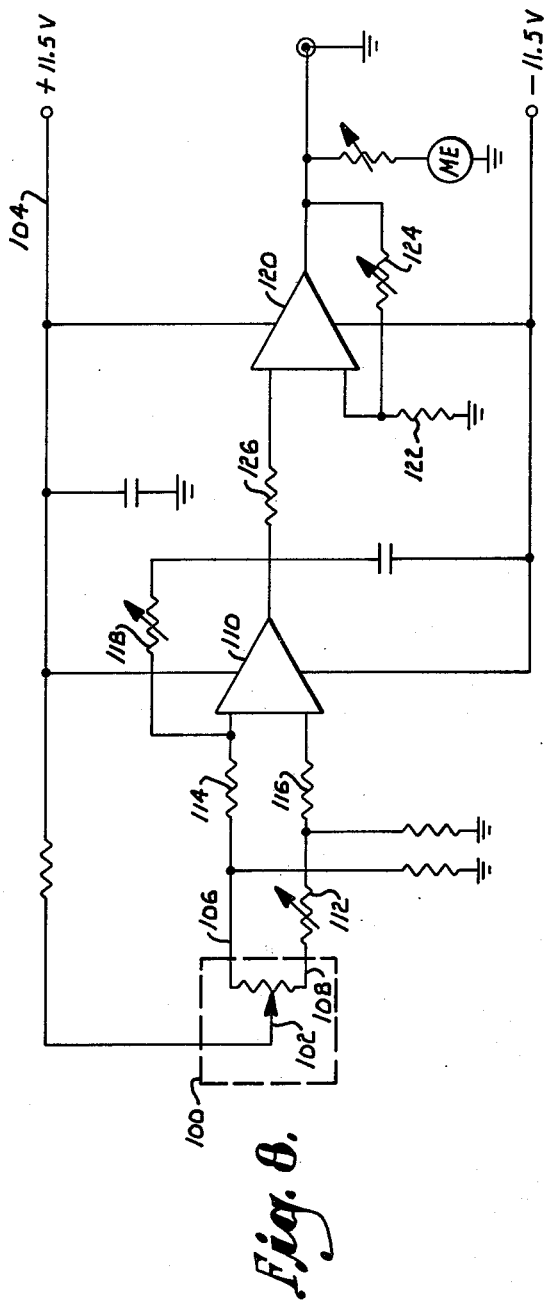
FIG. 8 is a diagram of an amplifier circuit used to amplify an electrical signal generated by the monitoring device as the thickness of the coated pipe is monitored.

Referring now to FIG. 8, the above mentioned potentiometer is generally indicated within broken line 100. The slider arm of this potentiometer is indicated by numeral 102 and is supplied with a regulated D.C. voltage potential at input 104. The two potentiometer output lines 106 and 108 are fed into differential operational amplifier 110. Variable resistor 112 is provided to serve as a fine zero adjustment. Operational amplifier 110 as connected in FIG. 8 acts as a precision voltage inverter and provides mulitplication of the input voltage by a constant. Through the proper selection of resistors 114, 116, and 118 a gain of approximately 100 (which defines a stable operating condition) can be obtained from operational amplifier 110. A second differential operational amplifier 120 is also provided in order to assure the stability of the first amplifier under excessive loading conditions. This amplifier acts as a non-inverting amplifier and by the proper choice of resistors 122, 124, and 126 also provides a gain of 100 without any resulting change in output polarity. The output of this amplifier is sufficient to drive a pen recorder (not shown) and can be encoded to provide a digital display of pipe diameter.

In operation, the relative movement of sensing arm 26 is imparted to the slider arm of the potentiometer thereby producing an electrical signal representative of the amount of coating material that has been applied to the pipe. The produced electrical signal is then amplified in operational amplifier 110. Since the resulting output of operational amplifier 110 represents the difference between the two inputs from potentiometer 100, the output is a linear function of the change of the outside diameter of the coated pipe around a given zero position. The resulting output of operational amplifier 110 is further amplified in differential operational amplifier 120. The output of this amplifier can then be sent to a voltage meter to give a voltage reading representative of the coating thickness about a given zero point, a pen recorder to provide a permanent record of variations in the coating thickness about a given zero position, or the encoder circuit of FIG. 9 to produce a digital display of the pipe diameter.

Figure 9:
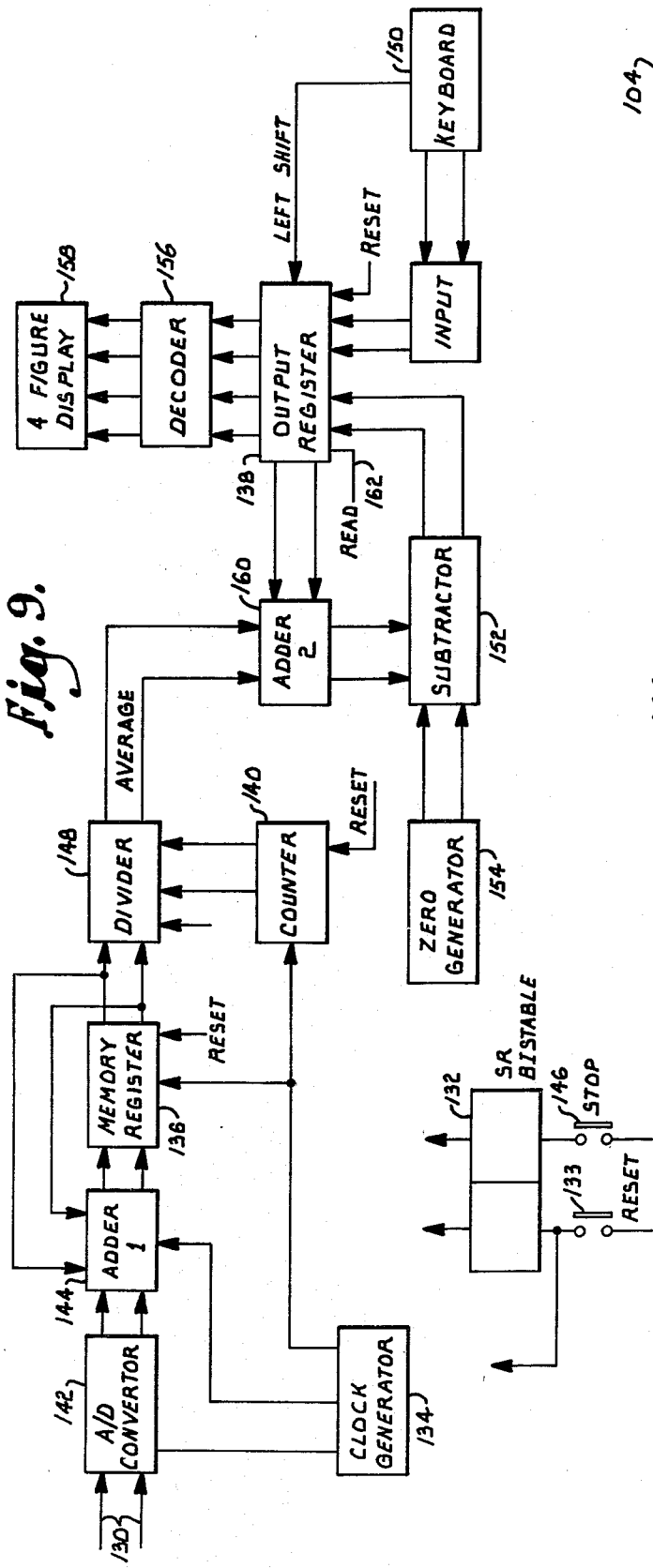
FIG. 9 is a diagram of the electrical circuit which converts the measurement obtained using the device of the present invention to a digital readout.

Referring now to FIG. 9, the amplified D.C. voltage signal from the amplifier circuit of FIG. 8 is fed into the digital encoder circuit at input terminal 130. Initiation of the encoding operation is accomplished by closing reset switch 133. Closure of this switch serves to reset output register 138, memory register 136, sample counter 140, and SR Bistable 132 and to initiate the operation sequence of the encoder circuit. The respective timing signals needed to clock the appropriate logic circuitry of the encoder circuit are derived by combining the outputs of SR Bistable Circuit 132 with the output of clock generator 134 in suitable logic circuitry.

The incoming D.C. voltage signal from the amplifier circuit is initially converted into a BCD signal in A/D converter circuit 142. The A/D converter has an input range of −5 to +5 volts in order to encompass a wide range of possible coating thicknesses about the zero position. Since the converter uses −5 volts as its reference voltage, an input signal of zero volts (representative of no deviation from the zero position) is 5 volts above the reference voltage and will be converted into a BCD signal of 0101. Therefore, the output of this circuit represents an adjusted coating thickness figure.

The digital signal from the A/D converter is then sent to adder circuit 144 where it is summed with the total of the previous adjusted thickness samples stored in memory register 136. The resultant sum is then stored in the memory register and sample counter 140 is incremented by one count. The above described conversion, addition, and storage sequence is continued until a stop signal is received from stop switch 146. It should also be noted that the D.C. input voltage from the amplifier circuit is inhibited during the addition and storage operations so that the coating thickness is measured at regular intervals along the pipe.

Upon the receipt of a stop signal, the resultant sum of the adjusted thickness samples stored in the memory register is divided, in divider circuit 148, by the number of count states stored in the sample counter to give the adjusted average coating thickness over the sampling interval. Thereafter, the adjusted average coating thickness figure is summed in adder circuit 160 with the outside diameter of the pipe previously stored in output register 138. The outside pipe diameter figure is punched into the encoder circuit by means of a calculator type keyboard 150. Subtractor circuit 152 then subtracts the output from zero generator 154 (in this case 0101) from the output total of adder circuit 160 to give the true diameter of the coated pipe. Depression of read button 162 reads the output of the subtractor circuit into output register 138 and decoder circuit 156 continually decodes the contents of the output register to give 4 figure display of the diameter of the coated pipe at 158.

The output signal from the above described amplifier circuit of FIG. 8 can also be fed into two center zero type pen recorders (not shown) in order to provide a method for manually checking the accuracy of the decoder circuitry. The first recorder can be set up to give a constant chart of the outside diameter variations about said zero position and the second recorder can be set up to make a permanent record of the average reading accepted by the computation circuits. The information recorded by these two pen type recorders can then be used to check the accuracy of the encoder circuit by ordinary mathematics.

It will also be apparent to those skilled in the art that the present invention contemplates a method for monitoring the amount of coating material applied to a cylindrical pipe utilizing a device as herein described. Manifestly, the method encompasses positioning the first and second arms of the device on the pipe in diametrically opposed relationship and allowing one arm to move in response to varying diameters of the coated pipe. The extent of movement of the one arm is observed to determine the amount of coating material being applied. The movement may be translated into an indication of the coating thickness and simply manually recorded or may be continuously recorded by automatic recording equipment. A further step of the invention contemplates that the step of observing the movement of the movable arm will take the form of translating a signal from the arm to the apparatus which is applying the coating material to vary the amount of material used in response to the observed measurement.

As previously mentioned, openings 60 and 88 in arms 26 and 28, respectively, may be utilized to secure weights for counterbalancing the torsional forces which tend to move the assembly in a counterclockwise direction when viewing FIG. 1. Particularly where shorter arms are substituted for arms 26 and 28, it may be necessary to affix weights for counterbalancing purposes. Also in this regard, boom 24 may be secured through any one of the aligned sets of holes 48 in bracket 44. By shifting the boom 24 to either the left or the right, the center of gravity of the unitary assembly comprising the boom plus the arms is accordingly shifted.

Having thus described the invention, what is claimed as new and desired to be secured by Letters Patent is:

1. A device for monitoring the amount of coating material applied to the outside of a rotating cylindrical pipe which is unaffected by any whipping action of the pipe, said device comprising:
rigid support means;
elongated mounting means coupled with said support means and disposed in a generally vertical plane;
first and second sensing arms carried by said mounting means for contacting the surface of the coated pipe,
one of said arms being pivotally coupled with said mounting means at a point above the second arm, the outer end of said one arm being pivotally movable up and down in accordance with variations in the thickness of the pipe coating; and
means for pivotally coupling said mounting means with said support means, said means for pivotally coupling said mounting means with said support means being disposed between a vertical plane passing through the outer ends of said sensing arms and a vertical plane passing through the combined center of gravity of said sensing arms plus said mounting means.

2. A device as set forth in claim 1, wherein said means for pivotally coupling said mounting means with said support means includes adjustable positioning means for varying the relative positions of said center of gravity and said pivotal coupling.

3. A device as set forth in claim 1, wherein is included means for displaying said variations in the thickness of the pipe coating.

4. A device as set forth in claim 3 wherein said means for displaying the variations in the thickness of the pipe coating comprises a gauge, and indicator means coupled with said one arm for movement in response to movement of the arm, said indicator means also being associated with said gauge for displaying a measurement of said variations in thickness.

5. A device as set forth in claim 4, wherein said means for displaying the variations in the thickness of the pipe coating comprises a potentiometer having a slider arm coupled with said one movable arm, and means coupled with said potentiometer for displaying an output in response to the voltage signal produced by the potentiometer.

6. A device as set forth in claim 5, wherein said displaying means comprises:
means for encoding said voltage signal into a digital signal, and means coupled with said encoding means for displaying an output response to said encoded digital signal.

7. A method for monitoring the amount of coating material applied to the outside of a rotating cylindrical pipe, which method is unaffected by any whipping action of the pipe, said method comprising:
providing first and second sensing arms for contacting the surface of the coated pipe, said arms being coupled together in a unitary assembly mounted for movement about a pivot axis;
locating said pivot axis at a position between a vertical plane passing through the center of gravity of said assembly and a vertical plane passing through the outermost ends of said arms thereby providing a torque force for countering pivotal movement of said assembly about said axis;
positioning said arms to contact the coated pipe in generally parallel horizontal planes at diametrically opposed locations;
the pipe contacting portion of the uppermost arm being movable up and down with respect to the lower arm in response to variations in the thickness of the pipe coating; and
sensing the extent of movement of the uppermost arm with respect to the remainder of the assembly.

8. A method as set forth in claim 7, wherein is included the step of translating the movement of said uppermost arm into an indicator of the thickness of the coating material.

* * * * *